(12) United States Patent
Lef et al.

(10) Patent No.: US 6,944,613 B2
(45) Date of Patent: Sep. 13, 2005

(54) METHOD AND SYSTEM FOR CREATING A DATABASE AND SEARCHING THE DATABASE FOR ALLOWING MULTIPLE CUSTOMIZED VIEWS

(75) Inventors: Alexey Lef, Raleigh, NC (US); Ronald William Angerer, Durham, NC (US)

(73) Assignee: SciQuest, Inc., Morrisville, NC (US)

( * ) Notice: Subject to any disclaimer, the term of this patent is extended or adjusted under 35 U.S.C. 154(b) by 202 days.

(21) Appl. No.: 10/318,814

(22) Filed: Dec. 13, 2002

(65) Prior Publication Data

US 2004/0117355 A1 Jun. 17, 2004

(51) Int. Cl.[7] .............................................. G06F 17/30
(52) U.S. Cl. .................. 707/3; 707/4; 707/5; 707/100; 707/101; 707/102
(58) Field of Search .......................... 707/3, 4, 10, 100, 707/101, 102, 1, 5, 6, 7; 705/1, 26, 21, 3, 27; 709/203, 217, 218, 220

(56) References Cited

U.S. PATENT DOCUMENTS

| | | | |
|---|---|---|---|
| 5,861,906 A | * | 1/1999 | Dunn et al. ................... 725/87 |
| 6,016,499 A | * | 1/2000 | Ferguson ................. 707/104.1 |
| 6,134,549 A | * | 10/2000 | Regnier et al. ................ 707/9 |
| 6,175,836 B1 | * | 1/2001 | Aldred ................... 707/103 R |
| 6,505,172 B1 | | 1/2003 | Johnson et al. |
| 6,513,038 B1 | * | 1/2003 | Hasegawa et al. ............. 707/7 |
| 6,564,213 B1 | * | 5/2003 | Ortega et al. .................. 707/5 |
| 6,687,693 B2 | * | 2/2004 | Cereghini et al. ............. 707/6 |
| 2001/0034733 A1 | * | 10/2001 | Prompt et al. ............. 707/102 |
| 2002/0007287 A1 | * | 1/2002 | Straube et al. ................. 705/3 |
| 2002/0078039 A1 | * | 6/2002 | Cereghini et al. ............. 707/4 |
| 2002/0120714 A1 | * | 8/2002 | Agapiev ..................... 709/218 |
| 2002/0143726 A1 | * | 10/2002 | Planalp et al. ................. 707/1 |
| 2002/0161861 A1 | * | 10/2002 | Greuel ....................... 709/220 |
| 2003/0135582 A1 | * | 7/2003 | Allen et al. ................. 709/217 |
| 2003/0144924 A1 | * | 7/2003 | McGee ........................ 705/27 |
| 2004/0177114 A1 | * | 9/2004 | Friedman et al. ........... 709/203 |

* cited by examiner

*Primary Examiner*—Frantz Coby
(74) *Attorney, Agent, or Firm*—A. José Cortina; Daniels Daniels & Verdonik, P.A.

(57) ABSTRACT

A method and system allows multiple customized views which are organization, user role, and end-user specific, to be generated from a single search engine and a product database. The database is assembled to contain product information, pricing information, organization-specific configurations defining approved suppliers and other similar items and views which are defined by organization. The product information is arranged and indexed by key product information. A search mask is created for each product based on various filters to allow selected products to be identified through the filter function.

15 Claims, 3 Drawing Sheets

METHOD AND SYSTEM FOR CREATING A DATABASE AND SEARCHING THE DATABASE FOR ALLOWING MULTIPLE CUSTOMIZED VIEWS

BACKGROUND OF THE INVENTION

1. Field of the Invention

The invention relates to a method and system for creating a database and searching the database for allowing multiple customized views which are organization and end user specific, to be generated from a single search engine and a product database.

2. Discussion of Prior Art

With the evolution of the Internet and World Wide Web, it has become necessary, as the number of web sites expands, to provide tools and systems through which web sites can be identified by content and other relevant criteria of interest to a user. As a result, certain computer programs generally known as "search engines" have been developed for the Internet, all of which search throughout the Internet to find specific web sites and topics of interest.

Under current technology, there are primarily five different types of search engines. A first type of search engine is what is known as a "crawler-based" search engine. Examples of such search engines are AltaVista, HotBot, and Lycos. They index sites by using computer programs called crawlers (or spiders, or robots) that follow links through the web and index the contents of every base they come across into a gigantic database.

Human edited directories provide a different type of search engine and are not true search engines. Examples of such search engines are Yahoo, LookSmart and the Open Directory Project. These types of programs are directories that are compiled by human editors. These editors are usually expert in a particular topic, and they review web sites and decide which to include in the directory.

A third type of search engine was developed as a result of the online advertising market shrinking, as a way of turning to alternate sources of revenue. These are known as Pay-Per-Click Options. An example of such a search engine is one commercially known as Overture (formerly GoTo.com.). On such a system, companies can bid for position for selected search terms and they are ranked relative to search results in accordance with how much they paid.

A fourth type of search engine involves engines that rank linked popularity. Google is one such type of engine and for every site it indexes, the engine looks at the number of links pointing at that site from other sites. Some editors of directories also consider site popularity.

Finally, the fifth type of search engine is what is known as a Meta search engine, which pulls other search engines and return results from multiple engines for the users. Examples of such engines are MetaCrawler, Mamma.com, DogPile, and WhatUSeek.

While useful on the Internet, these engines are not necessarily useful for searching proprietary databases linked to web sites accessible from the Internet. These search engines can obtain results from what is known as the "visible web." A separate part of the Internet is what is known as the "invisible web," and relates to information that cannot be retrieved in the search results and other links contained in these conventional types of search engine tools.

In this context, most of the invisible web is made up of the contents of thousands of specialized searchable databases. The search results from many of these databases are delivered to the user in web pages that are just for the search. The pages are very often not stored anywhere. Typically such databases are also protected by password and identification (ID) log in entry, and as a result are not accessible by conventional Internet search engines such as web crawlers, among other reasons, because such web crawlers cannot generate the necessary password and ID required for access to such databases.

When searching such databases, it is important to appreciate that they have been configured in a particular manner to address specific client or user needs and not of general interest to the general population. As a result, a number of different search engine technologies have been developed to allow efficient searching of such databases. However, a problem with current technologies involves the fact that even though directly tied to a particular type of database, current search engine technology does not optimize and provide a customized view for a specifically identified customer accessing the database, either directly through a private network or through the Internet.

The problems involved with such prior art systems are accordingly overcome by the system and method described herein.

SUMMARY OF THE INVENTION

In one aspect, there is provided a method of creating a product database capable of being searched by individual users, and which provides customized search results for each individual user, respectively. Databases are created by inputting data relating to product information, product pricing information, supplier organization specific information, and search view information relating to individual users, into a data store. The product information is arranged and indexed to allow searching thereof. A search mask is created for each product data based on product pricing information, supplier organization specific information and search view information.

In one specific aspect, the database is a collection of information concerning products.

In a yet more specific aspect, the products are laboratory research and reagent products for use by the scientific community and/or customer companies, in some cases, catalog listed products. Alternatively, other types of products in the database can be listed in a broad and not limited array of areas such as electronics, clothing, furniture, consumer products, etc., whether or not available through catalog or direct, retail or wholesale or other equivalent channels of commerce.

In a more specific aspect, the product information data includes product "stock keeping unit" (SKU) information, supplier information, product category information, product description information, and product attributes. The buying organization specific product database content is preferably configured using a Management Module (MM), for example, such as one providing the functionality of a program commercially available from SciQuest, Inc. under the name SelectSite®. This functionality in a specific implementation is known as the Catalog Management Module (CMM). The CMM, and other MMs, allow buying organizations to: turn suppliers' product information data on/off for viewing in search results of product information. Assign one of four levels of preferential treatment to suppliers in search results of product information (including an icon, colored background, and preferred positioning ("sorting products to the top"). Turn product categories on/off for viewing in search results of product information for all suppliers offering products in those categories. Turn product categories on/off for viewing in search results for specific suppliers. As will be readily apparent to those of ordinary skill in the art, and already noted, such functionality can be implemented in various different ways and is not limited to the specific implementation achieved by the CMM. Other types of Management Modules (MMs) can be used and implemented with similar functionality and not limited to catalog data. The search mask is preferably created as a bit map that is associated with each product for which data is stored in the database.

In an alternative aspect, the invention relates to a method of searching such a product database that involves a request to search the database with a search engine through a specified user input to the search engine. Information about all products matching the user input is returned and thereafter, the search mask is applied to each set of information about each product to determine if the product information should be provided to the user. Thereafter, the information for the filtered products is then provided to the user as the results of the search.

In a more specific aspect, the search engine used in association with the database at the search site can be one of several types such as a "probabilistic" search engine or a "text" search engine. In the case of a text search engine, this is a search engine that allows users to type in keyword terms and search the database for matching items. Such types of search engines are commercially available, for example, from companies such as Ascential Software under the commercial name of the Vality™ search engine. While one specific example of such a search engine has been provided, it will be readily apparent to those of ordinary skill in the art that other like search engines can be used in place thereof. In addition, such a search engine can be used in combination with other software components, for example, catalog management software resident at a user or customer site which interacts, for example, over the Internet or other network, and connects to the search engine at the database site to conduct searching of the database. Examples of such programs include programs such as those commercially available from SciQuest, Inc. under the name ERM™ or SelectSite.

The SelectSite application, for example, is a configurable, web-based sourcing, requisitioning and catalog management program which can be used by connecting with the search engine at the database site to search the database. Similarly, another like application is the ERM application, otherwise known as the Enterprise Reagent Manager™ application, also available from SciQuest, Inc., which provides the ability to locate reagents from internal inventory by chemical structure or name, or at other sites, which when interacting with the search engine employed in the system herein, allows review of end-user specific details on product information, pricing, availability, quality, safety and regulatory implications, and purchasing of the reagent as necessary.

BRIEF DESCRIPTION OF THE DRAWINGS

Having thus briefly described the invention, the same will become better understood from the appended drawings, wherein.

DETAILED DISCUSSION

Figure 2:
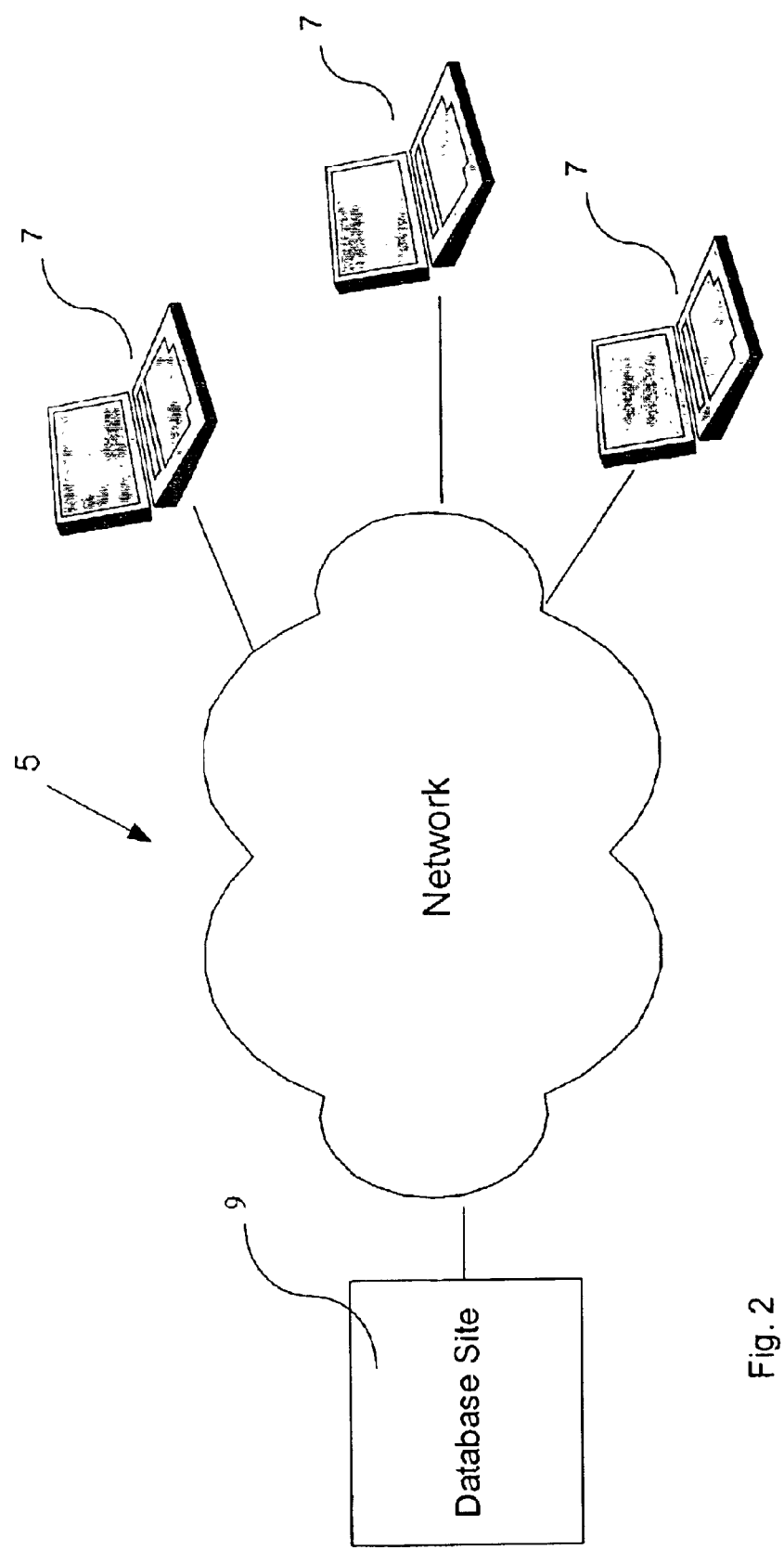
FIG. 2 is a general illustration of a typical environment in which the system and method herein might be implemented, for example, through connection from customer sites through the Internet or other network to a proprietary database.

FIG. 2 illustrates a typical environment in which the system and method of the invention may be implemented. As illustrated therein, a network 5 such as the Internet includes a number of customer or user sites or terminals 7 connected thereto. Also connected to the network 5, which may or may not be a proprietary network or an open network such as the Internet, is a database site 9 which includes a database and in which the method and system described herein may be implemented. Typically, when accessed through a network 5 such as the Internet, in order to gain access to the database at the database site 9, a user or customer may have to enter a password and identification entry, i.e., ID.

Having thus generally described one environment in which the method and system may be implemented, the following describes how the database in accordance with the invention described herein is configured, and may be created and searched.

Figure 1:
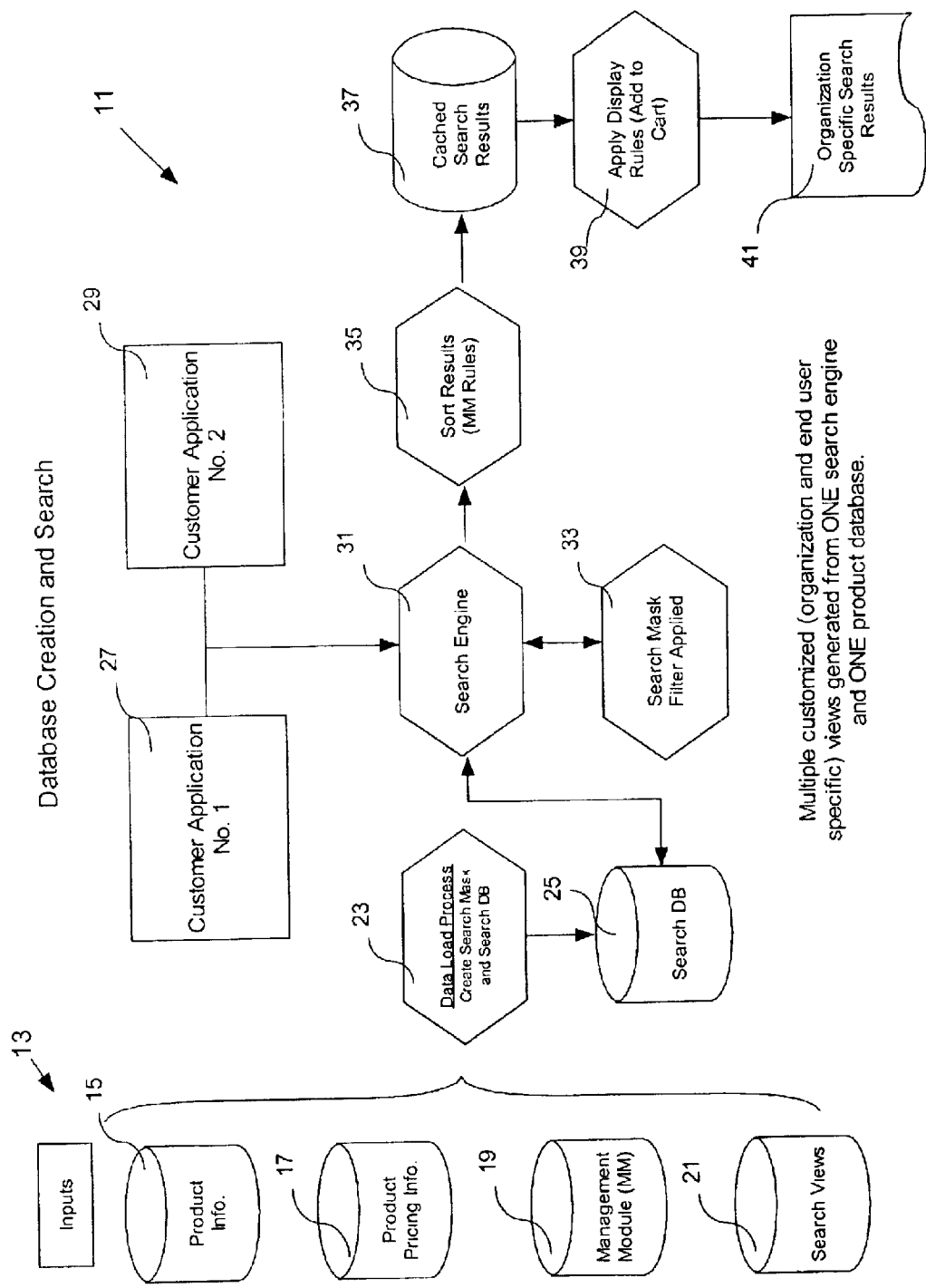
FIG. 1 is a general block diagram illustrating the creation of a database in accordance with the system and method herein, and the process of searching once the database has been created.

FIG. 1 illustrates at an overview level the steps 11 for database creation and search. In creating the database 25 a series of inputs 13 including product information 15, product pricing information 17, organization specific information defining approved suppliers, categories, and categories by suppliers, as well as preferred positioning, as part of a Management Module (MM), for example, the Catalog Management Module (CMM) is entered. Predefined search view 21 information is input. This information is defined by organization and assigned to users. View rules define the subset of database that an individual user can access. View rules can be defined on any product attribute including product category, supplier, price, etc. A load module 23 serves to load the data from the input and the data is arranged and categorized or indexed for optimal search performance as a function of the search engine used. All key product information is loaded into the database 25. Module 23 also serves to create a search mask for each product based on the pricing, the organization specific configuration, e.g., CMM, and the search view rules. The search mask is a bit mask that is associated with each product, and is described in greater detail hereinafter.

Once the database 25 has been assembled, a search can be conducted, for example, remotely from a customer site, through the use of customer specific applications 27 or 29.

As previously discussed, such applications can be simple web-accessing applications or more complex applications resident at a customer site providing enhanced functionality. In different aspects, customer application 27 can be one, as already noted, such as that available from SciQuest, Inc. under the name Enterprise Reagent Manager (ERM) which optimizes the management of reagent procurement and disposal for individual customers. Alternatively, such an application can also be one such as known commercially under the name SelectSite, also available from SciQuest, Inc. which is a configurable, web-based sourcing, requisitioning and catalog management solution for procurement of materials and products (both scientific and non scientific), and, in one specific but not limiting embodiment, particularly designed for research-intensive organizations for use in enterprise sourcing and procurement.

In conducting a search, a customer uses one of the applications 27 or 29 to connect with the search engine 31 also configured at the database site 9, which based upon customer inputs, generates a search within the database 25. Typically, search requests are generated as keyword searches or alternative type searches which will be readily apparent to those of ordinary skill in the art.

As already noted, the search engine 31 can be one such as that available under the name Vality from Ascential Software. Although one specific type search engine is described herein, it will be readily apparent that other like search engines can also be employed in the search process provided that similar functionality is employed.

The search engine applies its specific internal rules to find relevant records in the searchable database 25 based on user entered search requests. The entire database 25 is searched for products. No filtering with the search mask 33 is done until a complete result set is obtained. The bit locations corresponding to the view rules of the user are inspected in the search mask. If any of the inspected bits are set, i.e., set to 1, the record is retained as part of the result set. The filtered search results are then returned sorted in order of relevance, i.e., closest match to search terms. The search engine 31 is only used to search the database 25 and filter the results based on the search mask filter applied 33.

With respect to the search engine 31 itself, while a specific commercially available example has been discussed, many types of search engines can be employed in place thereof. Typically, such engines are generally known as being of several types, including but not limited to "probabilistic" search engines, "text" search engines, and those capable of providing similar functionality to achieve the results desired.

Thereafter, at step 35 the search results are sorted based on preferred positioning rules set up for each organization in the CMM. Results can also be sorted based on user input for specific product attributes such as supplier name, stock keeping unit (SKU), units of measure (UOM), product size, etc.

At step 37 the entire filtered and sorted search results are cached in memory.

At step 39 search display rules are applied to the results, and the well known "add to cart" functionality is modified as defined for each organization's rules. For example, reagent products may have language which replace the "add to cart" interface with an alternative interface. Organization specific pricing obtained from the database is also added to the search results.

At step 41 the organization specific search results are then returned to the application 27 or 29 that placed the original search request for use by the user.

Turing now to the search mask details, it is important to appreciate that the search mask is a bit map of 1's and 0's. Each bit represents a view and is mapped to an organization specific view. Thus, in the case of a bit map 1, 1, 1, 1, this represents four search views in example form as follows:

Bit 1 equals "XYZ" Organization main view

Bit 2 equals "XYZ" Organization reagent view (i.e., what a specific application addressing reagent procurement sees)

Bit 3 equals "ABC" Organization main view

Bit 4 equals "DEF" Organization main view

In accordance with the implementation of the search mask, the number of bits in the search mask increases each time a new search view is created. A bit equal to 1 means the product is viewable in the search view being used. It is important to appreciate that the search view being used is defined in the role of the user requesting the search results. A bit equal to 0 means the product is not viewable in the search view being used.

Figure 3:
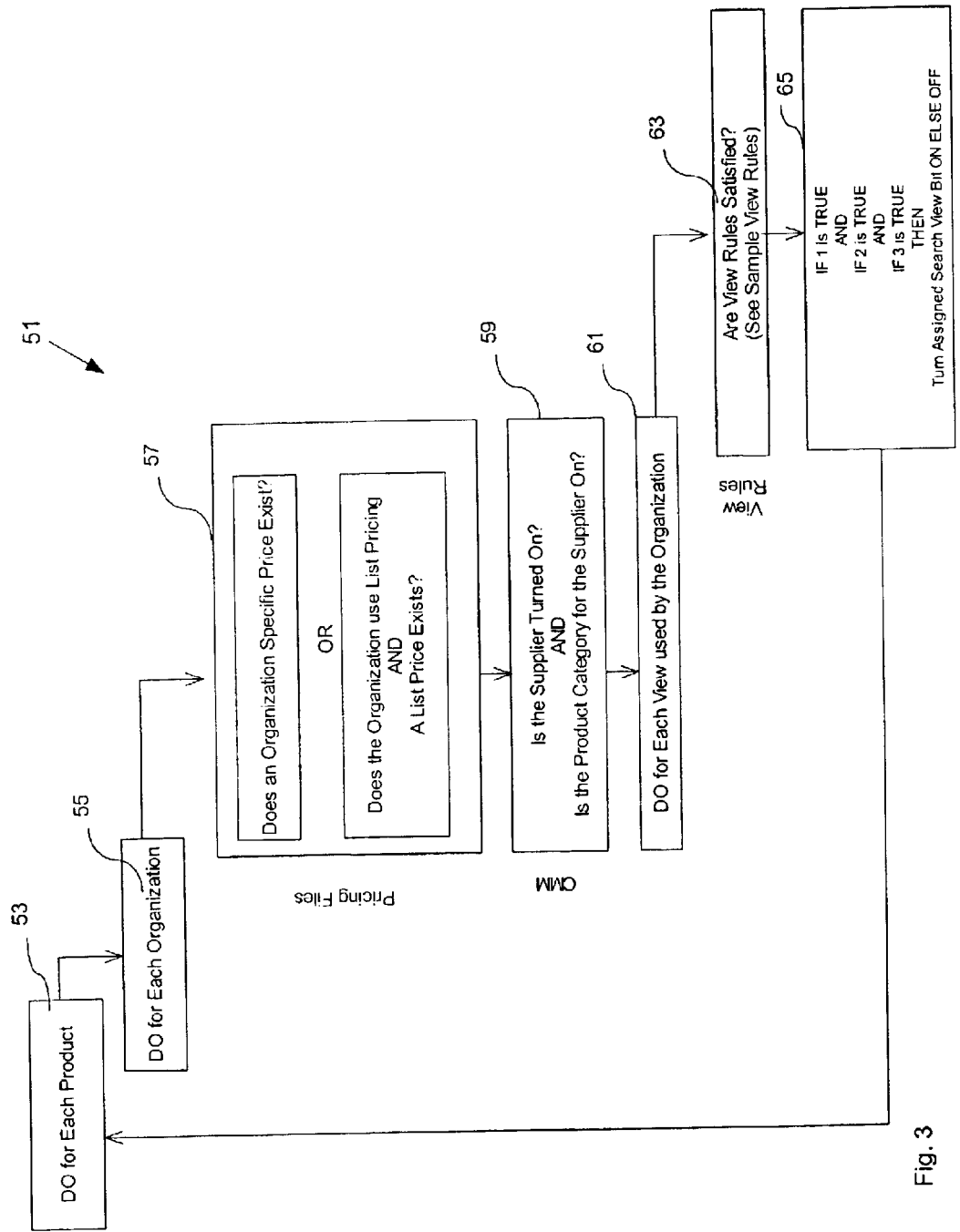
FIG. 3 is a block diagram illustrating how bit values are calculated for the search mask implemented in the invention for each product and each user organization.

FIG. 3 illustrates in greater detail how the bit value for each search mask is calculated. In accordance with block diagram 51 this process is initiated at step 53 for each product and at step 55 for each organization. At step 57 pricing files are accessed and a query is made as to whether an organization specific price exists or whether the organization uses list pricing and a list price exists. At step 59 a determination is made whether information for the supplier is available and is the specific product category for the supplier available. This is done at step 61 for each view used by an organization, and at step 63 a determination is made whether view rules for the organizations are satisfied. Sample views rules are illustrated hereafter. At step 65, a determination is made whether the inquiries made at steps 57, 59 and 61 are true. If the answer is yes, then the assigned search view bit is turned on as a 1. If the answer is no, it is turned on as a 0. The process is then repeated until each product and each organization is exhausted.

To further illustrate the implementation in FIG. 3, the following illustrates some sample view rules.

---

Logical expression operating on general attributes of the following objects:

Supplier
Category
Price
Product
Organization Defined
Examples

Product.Rad - FALSE AND Price.Amount <5000
OR Supplier.Stockroom = TRUE
Only show non-radioactive items under $5,000 or all Stock room items
Product.Type = COMPUTER
Only show products that are computer related

---

As will be readily apparent to those of ordinary skill in the art, such a bit map can be implemented in various different ways depending on the rules selected and views desired.

Having thus generally described the invention the same will become better understood from the appended claims in which it is set forth in a non-limiting manner.

What is claimed is:

1. A method of creating a product database capable of being searched by individual users, and which provides customized search results for each individual user, user group and/or organization respectively, comprising:

inputting data relating to product information, product pricing information, buyer organization specific information, and search view information relating to individual users, into a data store;

arranging and indexing the product information data to allow searching thereof;

creating a search mask for each set of product data based on product pricing information, organization specific information and search view information; and arranging said organization specific information in a specified manner with a Management Module under predetermined rules, and wherein said Management Module arranges the data in a manner under which said predetermined rules allow buying organizations to: turn specified suppliers' product information data on/off for viewing in search results of products; assign one of different levels of preferential treatment to suppliers in search results of product information; preferred position of products; turn product categories on/off for viewing in search results of product information for all suppliers offering products in those categories; and turn product categories on/off for viewing in search results for specific suppliers.

2. The method of claim 1, wherein said product information data comprises product stock keeping unit (SKU) information, supplier information, product category information, product description information, and product attributes.

3. The method of claim 1, wherein said search mask is created as a bit map that is associated with each product for which data is stored in the database.

4. The method of claim 1, wherein said search mask is created as a bit map of 1's and 0's, wherein each bit represents a view in which a bit of 1 indicates the information for a product is viewable in the search view being used and a bit of 0 indicates the product is not viewable in the search view being used.

5. A method of searching a product database, said database capable of being searched by individual users, and capable of providing customized search results for each individual user, respectively, comprising:

establishing a database in a data store comprised of data relating to product information, product pricing information, organization specific information, and search view information relating to individual users, said product information being arranged and indexed to allow searching thereof, and creating and storing a search mask for each set of product data based on product pricing information, organization specific information and search view information;

arranging the organization specific information in a specified manner with a Management Module under predetermined rules, and wherein said Management Module arranges the data in a manner under which said predetermined rules allow buying organization to search and obtain search results by: turning specified suppliers' product information data on/off for viewing in search results of products; assigning one of different levels of preferential treatment to suppliers in search results of product information; preferred position of products; turning product categories on/off for viewing in search results of product information for all suppliers offering products in those categories; and turning product categories on/off for viewing in search results for specific suppliers;

requesting a search of a database with a search engine through a specified user input to the search engine;

retaining information about all products matching the user input;

applying the search mask to each set of information about each product returned to determine if product information should be provided to the user; and providing information to the user about products about which information is allowed to be returned to the user.

6. The method of claim 5, wherein said search mask is a bit map associated with each product for which data is stored in the database.

7. The method of claim 5, wherein the search results are cached, specified display rules are applied to the results and only selected results specified for a specified user are displayed to the user.

8. The method of claim 5, comprising using a search engine to conduct searching.

9. The method of claim 5, further comprising returning search results in order of relevance.

10. The method of claim 5, wherein said specified user input to request a search is a product attribute.

11. The method of claim 5, further comprising arranging the product information in accordance with a preferred positioning arrangement.

12. A database system for providing information about products to individual users in a manner in which customized search results can be provided to each individual user, respectively, comprising:

a data store of data relating to product information, product pricing information, supplier organization specific information, and search view information relating to individual users;

said product information data being arranged and indexed to allow searching thereof;

a search mask for each product data based on product pricing information, supplier organization specific information, and search view information for filtering search results in accordance with specified users to allow a customized view of search results to be provided to each user, respectively; and a Management Module arranging said organization specific information in a specific manner under predetermined rules, with said Management Module having said data arranged in a manner under which said predetermined rules allow buying organizations to: turn specified suppliers' product information data on/off for viewing in search results of products; assign one of different levels of preferential treatment to suppliers in search results of product information; preferred position of products; turn product categories on/off for viewing in search results of product information for all suppliers offering products in those categories; and turn product categories on/off for viewing in search results for specific suppliers.

13. The system of claim 12, wherein said product information data comprises product stock keeping unit (SKU) information, supplier information, product category information, product description information, and product attributes.

14. The system of claim 12, wherein said search mask is a bit map that is associated with each product for which data is stored in the database.

15. The system of claim 12, wherein said search mask is a bit mask of 1's and 0's, wherein each bit represents a view in which a bit of 1 indicates the information for a product is viewable in the search view being used and a bit of 0 indicates the product is not viewable in the search view being used.

* * * * *